(12) United States Patent
Tanaka et al.

(10) Patent No.: US 6,567,140 B2
(45) Date of Patent: May 20, 2003

(54) LIQUID CRYSTAL DISPLAY DEVICE PROVIDED WITH REFLECTION SHEET AND METHOD OF FABRICATING REFLECTION SHEET

(75) Inventors: Masashi Tanaka, Kyoto (JP); Yukito Toriumi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/228,335

(22) Filed: Aug. 27, 2002

(65) Prior Publication Data
US 2003/0043324 A1 Mar. 6, 2003

(30) Foreign Application Priority Data
Aug. 30, 2001 (JP) ........................................ 2001-261389

(51) Int. Cl.[7] ............................................. G02F 1/1335
(52) U.S. Cl. ....................................................... 349/113
(58) Field of Search ................................. 349/122, 113, 349/115, 97

(56) References Cited

U.S. PATENT DOCUMENTS

| | | | | |
|---|---|---|---|---|
| 4,436,377 A | * | 3/1984 | Miller | 349/114 |
| 6,219,120 B1 | * | 4/2001 | Sasaki et al. | 349/113 |
| 6,476,888 B2 | * | 11/2002 | Yamanashi | 349/106 |

* cited by examiner

Primary Examiner—Toan Ton
(74) Attorney, Agent, or Firm—Sughrue Mion, PLLC

(57) ABSTRACT

The production of a defective liquid crystal display device is restrained and a yield of the liquid crystal display device is improved by detecting previously a flying of an adhesive on a reflection sheet of the liquid crystal display device. The liquid crystal display device comprises glass substrates, liquid crystal sealed between the glass substrates, and polarization films attached to the glass substrates and the like, wherein an adhesive for bonding the reflection sheet onto the back side of the liquid crystal display device is colored with a color which is different from that of the reflection sheet so as to easily visually recognize and detect the flying of the adhesive within an effective display region of the reflection sheet when the adhesive is printed.

1 Claim, 2 Drawing Sheets

LIQUID CRYSTAL DISPLAY DEVICE PROVIDED WITH REFLECTION SHEET AND METHOD OF FABRICATING REFLECTION SHEET

FIELD OF THE INVENTION

The invention relates to a liquid crystal display device provided with a reflection sheet on the back side and a method of fabricating the reflection sheet.

BACKGROUND OF THE INVENTION

A liquid crystal display device provided with a reflection sheet for effecting a display utilizing reflection of an external light is frequently used by miniature electronic equipment, and the like.

FIG. 3 is a sectional view showing the construction of an example of a conventional reflection type liquid crystal display device 10. The liquid crystal display device 10 generally comprises glass plates 11, 12, liquid crystal 13 which is enclosed between the glass plates 11, 12, and an adhesive 16 for sealing the liquid crystal 13, and polarization plate 14, 15 attached to the outside of the glass plates 11, 12. In such a liquid crystal display device, a colored reflection sheet 2 is bonded onto a back side of a panel by an adhesive 3 for coloring the back ground of the panel.

The reflection sheet used in a conventional liquid crystal display device is formed by color printing on a white original plate or blank made of resin, e.g., polyester by an appropriate size to form plural reflection sheets, coating an adhesive on the original plate e.g., by screen printing so as to bond the reflection sheets onto glass plates of the liquid crystal display device. However, the adhesive used conventionally has no color, and hence there are following problems.

(1) When the adhesive is coated on the original plate, e.g. by screen printing, if there is a pinhole on a plate for printing, or if there occurs the flying of the adhesive when peeling off the screen after printing, the adhesive is prone to stick to an unwanted portion of each reflection sheet, which is however hardly detected.

(2) If the reflection sheet is bonded to the polarization plate 15 in a state where there occurs the flying of adhesive on the reflection sheet, the adhesive appears as a black point, causing a problem that the liquid crystal display device becomes defective.

(3) When the reflection sheet is prepared from the original plate, e.g. by a punching process, or colored printed portion of the original plate and a plate for printing an adhesive are aligned with each other, the operations thereof are not easily effected if the adhesive has no color and also the position of the adhesive is hardly read out by a camera, and hence it is impossible to employ a machining method for machining the components on the basis of data read out by the camera.

SUMMARY OF THE INVENTION

The invention has been made in view of the problems of the conventional liquid crystal display device, and it is an object of the invention to fabricate a reflection sheet automatically by easily detecting the sticking of an adhesive onto an unwanted portion of the reflection sheet, easily aligning between the colored printed portion of an original plate and a plate for printing an adhesive, and reading out a coating state of the adhesive by a camera.

To achieve the above object, a liquid crystal display device having a reflection sheet bonded onto the back side thereof according to the first aspect of the invention is characterized in that a reflection sheet is bonded onto the back side by an adhesive which is different from the reflection sheet in color.

A method of fabricating a reflection sheet of the liquid crystal display device according to the second aspect of the invention is characterized in comprising the steps of printing and forming multiple colored portions and an alignment mark on an original plate, coating each colored portion with a colored adhesive at a given position while the alignment mark serves as a reference position, and cutting the colored portion coated with the adhesive from the original plate.

The method of fabricating a reflection sheet of the liquid crystal display device according to the third aspect of the invention is characterized in that in second aspect of the invention a screen for printing the adhesive is aligned with the alignment mark serving as a reference position and the colored portion is coated with the colored adhesive at a given position.

PREFERRED EMBODIMENT OF THE INVENTION

Figure 1:
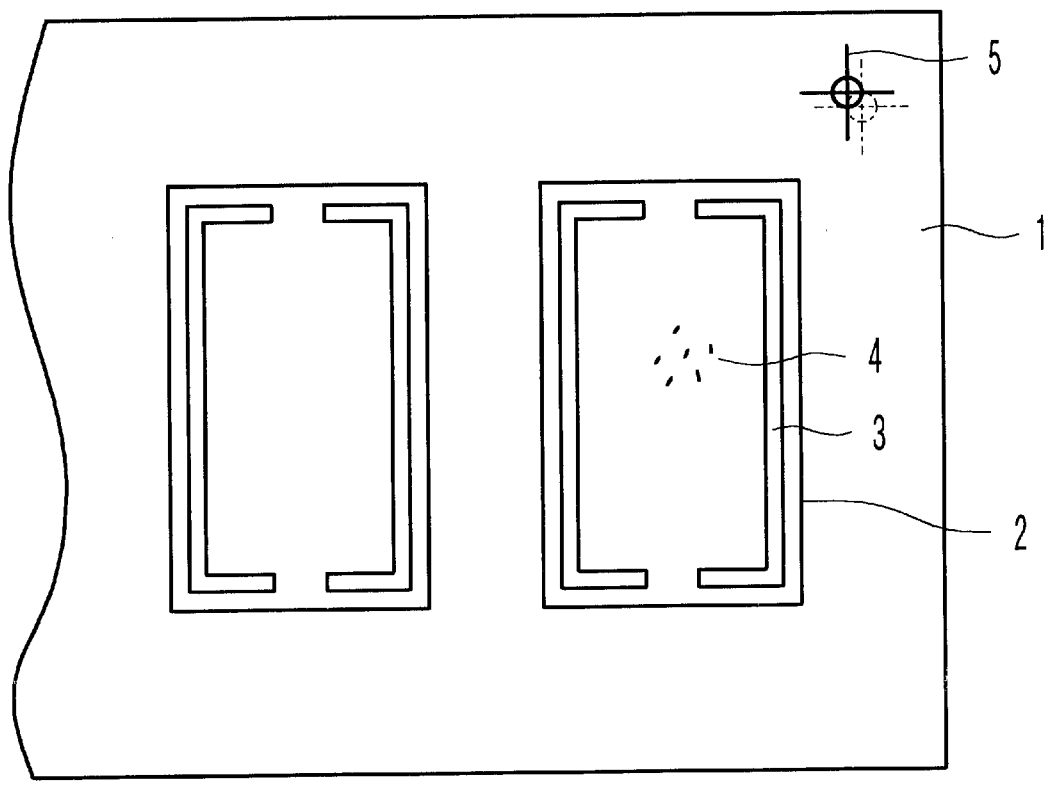
FIG. 1 is a plan view showing a part of an original plate for use in a liquid crystal display device, showing a state where multiple reflection sheets are coated with a colored adhesive.

FIG. 1 is a plan view showing a state where multiple reflection sheets 2 are printed on a white original plate 1 made of resin (hereinafter referred to as simply original plate).

Respective multiple reflection sheets 2 are separated from the original plate 1 in a state shown in FIG. 1, by e.g., a punching process and they are bonded onto polarization plate 15 on the back side of a liquid crystal display device 13 by printed adhesive portions 3 coated onto the reflection sheets 2, thereby forming a color panel.

Each reflection sheet 2 is fabricated in the following steps. That is, multiple colored portions (reflection sheets) 2 each having a given size are formed on the original plate 1 made of, e.g. polyester, by e.g., screen printing, and an alignment mark 5 is printed on the original plate 1.

Then, a plate for screen printing is aligned on the basis of the alignment mark 5 and an adhesive which is colored along the edge of each colored portion at a given position is subjected to screen printing in a given width to form the printed adhesive portion 3. After the colored portion 2 and the printed adhesive portion 3 are formed on the original plate 1, the printed adhesive portion 3 are separated into individual reflection sheets 2, by e.g., punching tool, not shown. When the printed adhesive portion 3 is separated into individual reflection sheets 2 by the punching tool, the punching tool is aligned on the basis of the alignment mark 5 so that the reflection sheets 2 are cut off from the original plate 1 with high accuracy.

In the fabricating method set forth above, if there is a pinhole in a plate for screen printing or if there occurs the flying of an adhesive which is stuck onto the screen when the screen is peeled off after printing, there is a possibility that the adhesive 3 is stuck onto an effective display region of each reflection sheet 2. Since the adhesive 3 is colored by a color which is different from that of each reflection sheet 2 according to the preferred embodiment, the flying 4 of the adhesive 3 can be easily identified.

Since the adhesive 3 for bonding each reflection sheet 2 onto the back side of a liquid crystal display device 10 is colored, it is easily detected as to whether the adhesive 3 is properly stuck onto each reflection sheet 2 at a given position or not. Further, since the alignment mark 5 is printed onto the original plate 1, printing work on the original plate and separation of each reflection sheet therefrom may easily and accurately be carried out with referencing the alignment mark 5. Accordingly, it is possible to automate the fabrication of the reflection sheet 2 by combining with an automatic recognition function e.g., by a camera.

Figure 2:
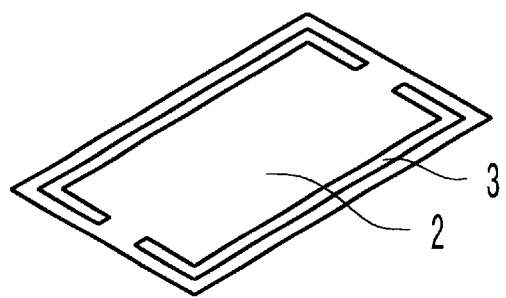
FIG. 2 is a perspective view of a reflection sheet coated with the colored adhesive.
Figure 3:
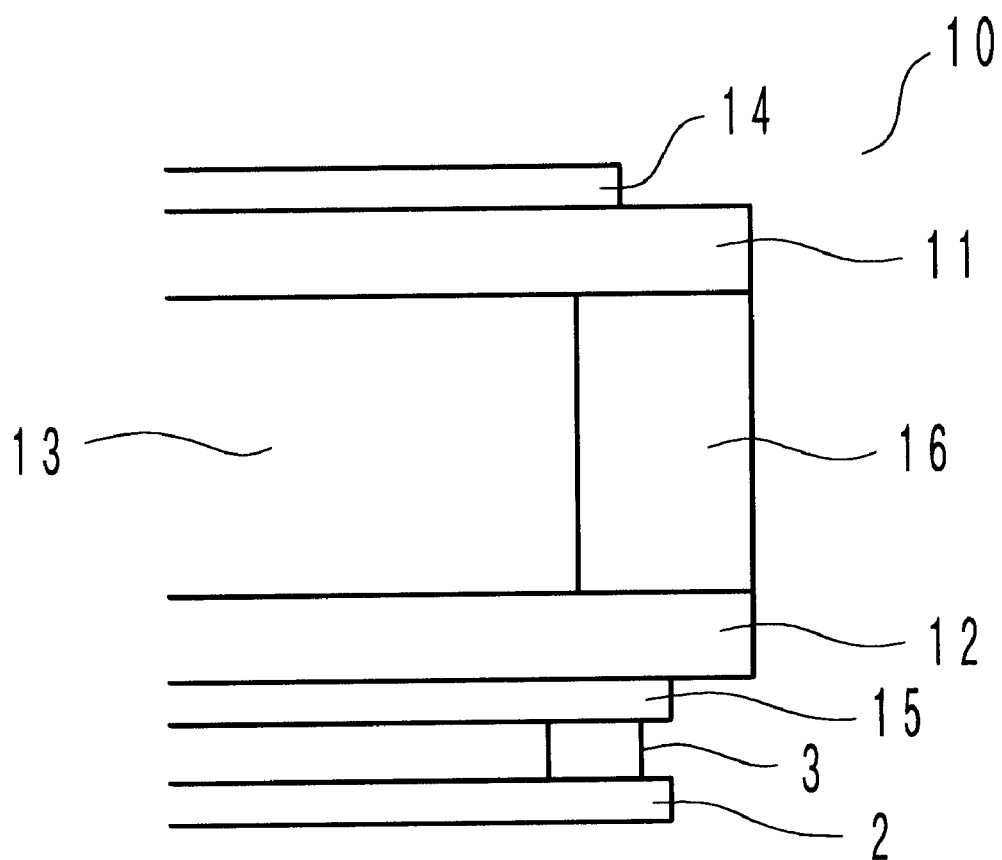
FIG. 3 is a sectional view showing a part of a liquid crystal display device provided with a conventional reflection sheet.

FIG. 2 shows the reflection sheet 2 which was fabricated on the foregoing process. The colored adhesive 3 is stuck onto the reflection sheet 2 along the edge thereof at a given position with a given width. When the reflection sheet 2 is bonded onto the back side of the substrates of the transmission liquid crystal display device 10, a colored panel which is the same as the conventional one can be obtained.

According to the invention, since the adhesive for bonding the reflection sheet onto the liquid crystal display device is colored, it is possible to easily detect the flying of the adhesive on an unwanted portion when each reflection sheet is coated with the adhesive, and the flying of the adhesive can be avoided before each reflection sheet is bonded onto the glass plate of the liquid crystal display device, thereby preventing the occurrence of defective liquid crystal display device in advance.

When the reference mark is used in case where the original plate is coated with the adhesive or each reflection sheet is separated from the original plate by punching process and the like, accuracy of the aligning between the printed reflection sheet, the coating position of the adhesive and the cut lines of the reflection sheet is improved, and a given width of the adhesive can be obtained without fail, thereby improving reliability of adhesiveness.

Further, since the colored adhesive is employed, it can be automatically recognized by a camera so that the aligning between the sheet printing position and adhesive coating position, and the detection of flying of the adhesive on an unwanted portion are respectively automated, thereby establishing stability and improvement of quality of the reflection sheet to be fabricated.

What is claimed is:

1. A liquid crystal display device provided with a reflection sheet on a back side on the liquid crystal display device, wherein the reflection sheet is bonded onto the back side by an adhesive which is different from the reflection sheet in color.

* * * * *